United States Patent
Krause et al.

(10) Patent No.: US 10,144,396 B1
(45) Date of Patent: Dec. 4, 2018

(54) VEHICLE WASH CONTROL SYSTEM

(71) Applicant: Cleaning Systems, Inc., DePere, WI (US)

(72) Inventors: David R. Krause, DePere, WI (US); Donald J. Pansier, Green Bay, WI (US); Daniel J. Mathys, Pulaski, WI (US); Kenneth R. Smith, DePere, WI (US)

(73) Assignee: Cleaning Systems, Inc., DePere, WI (US)

( * ) Notice: Subject to any disclaimer, the term of this patent is extended or adjusted under 35 U.S.C. 154(b) by 0 days.

(21) Appl. No.: 15/674,111

(22) Filed: Aug. 10, 2017

(51) Int. Cl.
| | |
|---|---|
| *B08B 7/00* | (2006.01) |
| *B60S 3/04* | (2006.01) |
| *B60S 3/00* | (2006.01) |
| *G05D 7/06* | (2006.01) |

(52) U.S. Cl.
CPC ............... *B60S 3/04* (2013.01); *B60S 3/004* (2013.01); *G05D 7/0641* (2013.01)

(58) Field of Classification Search
CPC ... G06Q 10/06; B60S 3/00; B60S 3/04; B60S 3/004; G05D 7/0641
See application file for complete search history.

(56) References Cited

U.S. PATENT DOCUMENTS

| | | | |
|---|---|---|---|
| 3,036,739 A | 5/1962 | Kamysz, Jr. | |
| 3,307,744 A | 3/1967 | Burford | |
| 3,319,637 A | 5/1967 | Gore | |
| 3,438,583 A | 4/1969 | Lawrence | |
| 3,573,862 A | 4/1971 | Brown | |
| 3,606,091 A | 9/1971 | Grisham | |
| 3,684,184 A | 8/1972 | Lafferty | |
| 4,289,276 A | 9/1981 | Bollina | |
| 4,912,681 A | 3/1990 | Halsey | |
| 4,967,960 A | 11/1990 | Futrell | |
| 4,986,497 A | 1/1991 | Susko | |
| 4,999,763 A | 3/1991 | Ousborne | |
| RE33,849 E | 3/1992 | Detrick | |
| 5,231,722 A | 8/1993 | Shacklock | |
| 5,624,409 A * | 4/1997 | Seale | A61M 5/16809 604/246 |
| 5,647,387 A | 7/1997 | Tsutsui | |
| 5,967,066 A * | 10/1999 | Giles | A01C 23/024 111/119 |
| 6,293,290 B1 * | 9/2001 | Bruce | B60S 3/044 134/100.1 |
| 6,571,807 B2 | 6/2003 | Jones | |
| 6,696,399 B1 | 2/2004 | Chernin | |
| 6,718,216 B2 | 4/2004 | Grier | |
| 6,726,779 B2 | 4/2004 | Klos | |
| 6,871,103 B2 | 3/2005 | Van Kessel | |

(Continued)

FOREIGN PATENT DOCUMENTS

WO    WO2007/039266    4/2007

*Primary Examiner* — Alexander Markoff
(74) *Attorney, Agent, or Firm* — Neustel Law Offices

(57) ABSTRACT

A vehicle wash control system for controlling the amount of wash product applied to a vehicle based on environmental or other conditions, sensed locally or controlled/sensed remotely. The vehicle wash control system generally includes one or more electronic control valves that may be controlled by a control unit that receives inputs from a sensor or remotely which adjusts the flow of wash products responsive to the inputs.

13 Claims, 5 Drawing Sheets

(56) References Cited

U.S. PATENT DOCUMENTS

| | | |
|---|---|---|
| 6,921,027 B2 | 7/2005 | Firestone |
| 7,045,021 B2 | 5/2006 | Ewing |
| 7,384,902 B2 | 6/2008 | Chernin |
| 7,582,164 B1 | 9/2009 | Krause |
| 8,527,372 B2 | 9/2013 | Sanville |
| 8,636,174 B1 * | 1/2014 | Motkowski ........... B67D 1/1295 222/1 |
| 8,813,765 B2 | 8/2014 | Petit |
| 9,117,233 B2 | 8/2015 | Harter |
| 9,139,166 B2 | 9/2015 | Belanger |
| 9,381,547 B1 | 7/2016 | Mathys |
| 9,476,748 B1 | 10/2016 | Krause |
| 9,623,385 B2 | 4/2017 | Krause |
| 9,676,371 B1 | 6/2017 | Krause |
| 2003/0127119 A1 * | 7/2003 | Scordo ..................... B60S 3/04 134/57 R |
| 2003/0127534 A1 * | 7/2003 | Firestone ............... B01F 3/088 239/61 |
| 2005/0076818 A1 * | 4/2005 | Grimm ................ A01C 23/024 111/119 |
| 2005/0187515 A1 * | 8/2005 | Varrichio .......... A61M 5/14276 604/67 |
| 2005/0234569 A1 | 10/2005 | Byrer |
| 2005/0256025 A1 | 11/2005 | Chernin |
| 2007/0227558 A1 | 10/2007 | Chase |
| 2008/0046278 A1 * | 2/2008 | Sanville .................... B60S 3/00 700/283 |
| 2010/0186778 A1 | 7/2010 | Martin |
| 2012/0271467 A1 * | 10/2012 | Grimm ............... A01M 7/0089 700/283 |
| 2016/0054157 A1 | 2/2016 | Krause |
| 2016/0175891 A1 | 6/2016 | Mathys |
| 2017/0216785 A1 | 8/2017 | Krause |

\* cited by examiner

VEHICLE WASH CONTROL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Exemplary embodiments in general relate to a vehicle wash control system for controlling or varying the level of vehicle washes depending on weather conditions, vehicle condition, or other variables.

Related Art

Any discussion of the related art throughout the specification should in no way be considered as an admission that such related art is widely known or forms part of common general knowledge in the field.

Vehicle washes are comprised of various types of facilities capable of washing various types of vehicles (e.g. cars, trucks, planes, trains) such as but not limited to self-service manual vehicle washes, in-bay automatic vehicle washes, and tunnel vehicle washes. Vehicle washes dispense various types of products including but not limited to water, detergent, protective coatings (e.g. wax, polish), tire dressing, coloring, spot free rinse and the like.

A vehicle wash needs to accurately control the amount of product dispensed to ensure a quality wash of a vehicle and to avoid wasting costly products. Rather than always providing a fixed amount of product under all conditions, it would be advantageous to be able to vary the amount of product or other factors to achieve an optimal wash without wasting products.

SUMMARY

The vehicle wash control system includes a product dispensing system that includes a wash product supply fluidly connected to one or more control valves under the control of one or more control units. The control valves operate at an open/close ratio (e.g., duty cycle) that allows the amount of wash product used on each vehicle to vary, and the control unit or units allow for the control of the amount based on any number of variables, such as season, location, weather conditions, wash duration, vehicle speed in the vehicle wash, a vehicle conveyor speed, vehicle wash equipment speed, the desired level of vehicle cleanliness, dirt level, chemicals, variations in chemical product condition (e.g. viscosity and/or temperature of chemical product), or other materials present on vehicles, etc. The variables may be sensed or otherwise determined by one or more sensors in communication with the control unit.

Further, the control unit may vary the amount of product based on inputs received locally or remotely, and may be under automatic or manual control in either the remote or local control scheme.

There has thus been outlined, rather broadly, some of the embodiments of the vehicle wash control system in order that the detailed description thereof may be better understood, and in order that the present contribution to the art may be better appreciated. There are additional embodiments of the vehicle wash control system that will be described hereinafter and that will form the subject matter of the claims found below. In this respect, before explaining at least one embodiment of the vehicle wash control system in detail, it is to be understood that the vehicle wash control system is not limited in its application to the details of construction or to the arrangements of the components set forth in the following description or illustrated in the drawings. The vehicle wash control system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Exemplary embodiments will become more fully understood from the detailed description given herein below and the accompanying drawings, wherein like elements are represented by like reference characters, which are given by way of illustration only and thus are not limiting of the embodiments herein.

DETAILED DESCRIPTION

A. Overview

An exemplary embodiment is directed to a vehicle wash system that allows for quickly changing (in real time if desired) the chemistry of the wash solution and/or the volume/flowrate of chemical solution applied to an individual vehicle. The temperature and pressure may also be varied or controlled. The goal is to efficiently and effectively clean, dry and shine each individual car or vehicle without having to do a rewash.

Figure 1:
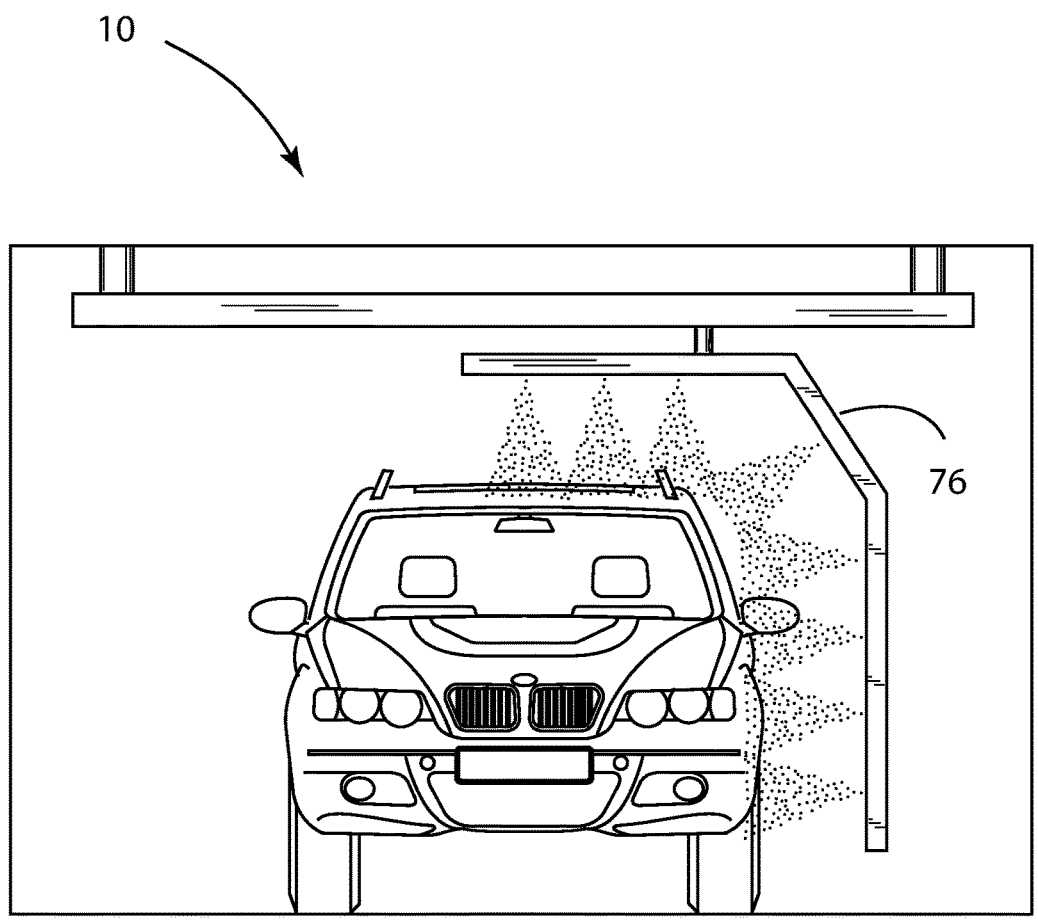
FIG. 1 is a perspective view of a vehicle wash control system in accordance with an exemplary embodiment.
Figure 2:
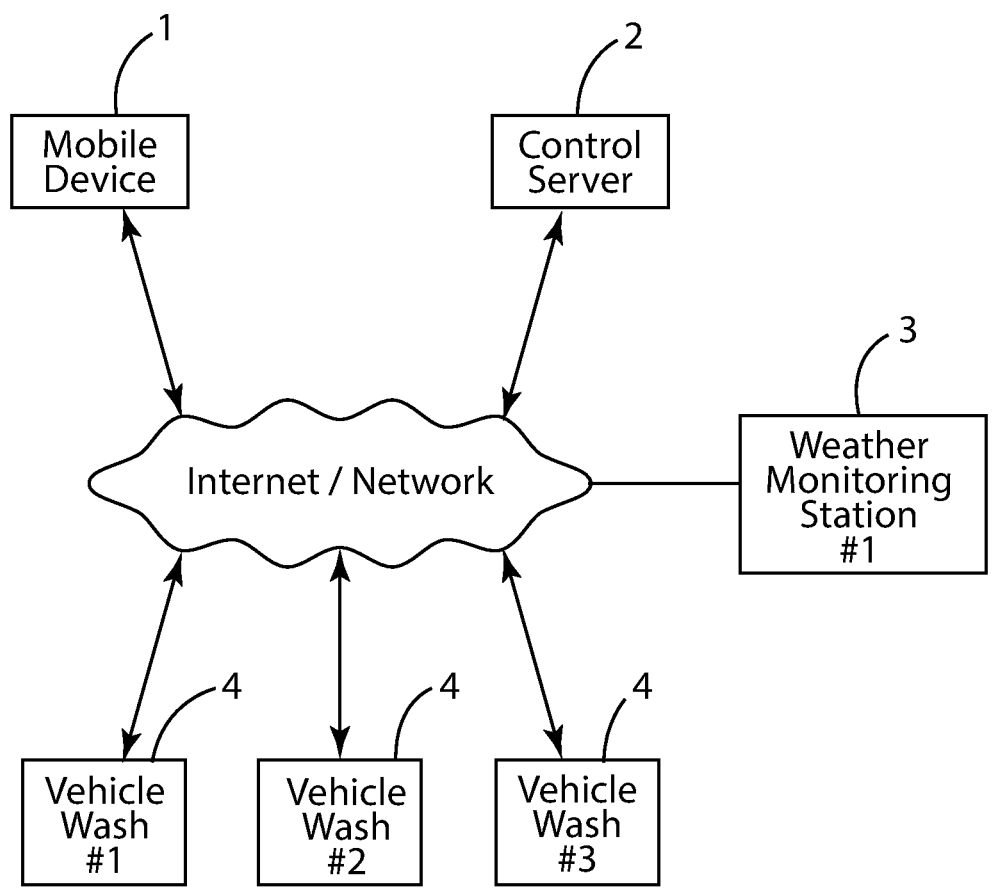
FIG. 2 illustrates an overall view of communications that may be used with exemplary embodiments of the system.

FIG. 1 shows an exemplary vehicle wash 10. As shown in FIG. 2, an exemplary vehicle wash control system generally includes a communication network such as the Internet, with which vehicle washes 1-3 (denoted by item 4) are in communication via control server 2. The various embodiments of the invention may be operated locally or via a global computer network such as the Internet. In actual use, any number of vehicle washes 4 may be controlled by the exemplary system. By use of the communication network, a mobile device 1, as described below, may be used to provide inputs manually into the system by communicating with control server 2 via the communication network. In an exemplary vehicle wash, mobile device 1 may be used to manually change chemical ratios or flow rates to be used at one or more vehicle washes. If desired, pre-programmed "wash profiles" may be used to facilitate such uses. For example, a preexisting wash profile applicable to a certain condition (high pollen count, high insect concentrations, environmental conditions, etc.) may be used to select and control the proper wash product flow rates used at one or more vehicle washes in the system.

In the exemplary system of FIG. 2, a weather monitoring station 3 may also be used. The weather monitoring station may be used to adjust wash conditions or a wash profile at one or more of the vehicle washes 4 automatically. As with mobile device 1, weather monitoring station 3 interfaces with the system via communication network and control server 2. In addition to the remote communications shown in FIG. 2, each vehicle wash may utilize local sensors to adjust its wash conditions, either in conjunction with, or independent of, any remote inputs received via the communication network.

B. Exemplary Telecommunications Networks

The vehicle wash control system may be utilized with any telecommunications network or other communications network capable of transmitting data including voice data and other types of electronic data. Examples of suitable telecommunications networks for the vehicle wash control system include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The vehicle wash control system may communicate via a single telecommunications network or multiple telecommunications networks concurrently. Various protocols may be utilized by the electronic devices for communications such as but not limited to HTTP, SMTP, FTP and WAP (wireless Application Protocol). The vehicle wash control system may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The vehicle wash control system may also be utilized with online services and internet service providers.

The Internet is an exemplary telecommunications network for the vehicle wash control system. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Control Server

The control server 2 may be comprised of any central communication site where communications are established. The control server may be comprised of a server computer, cloud-based computer, virtual computer, home computer or other computer system capable of receiving and transmitting data via IP networks and the telecommunication networks. As can be appreciated, a modem or other communication device may be used or required between each of the control servers and the corresponding telecommunication networks. The control server may be comprised of any electronic system capable of receiving and transmitting information (e.g. voice data, computer data, etc.).

The control server gives an operator the ability to accurately control the product concentration, flowrate and/or volume level at the vehicle washes depending on weather conditions or other variables. For example, if it recently rained at the location of a vehicle wash, the operator could submit instructions via a mobile device, such as mobile device 1, to increase the cleaning level of the vehicle wash (for example, by using different chemicals, increasing the amount of time of the wash, or changing other cleaning variables.). The control server may administer similar control automatically, for example, by receiving data from a weather monitoring station.

Using the present system, two or more vehicle washes may be controlled together. For example, if vehicle washes 1 and 2 are located in city A and vehicle wash 3 is located in city B, the different weather or other conditions for each city may be used to control the vehicle washes. For example, if it rains in city A while it remains sunny in city B, the operator (or the control server, automatically), may submit a single control command to change the vehicle wash settings for vehicle washes 1 and 2.

Preset wash profiles may be used to change wash operating characteristics, such as chemical concentration, flow rate, volume of liquid or product applied, number of wash passes or the speed of wash passes. This system is capable of changing the wash characteristics immediately, and in real time, so that individual, consecutive vehicles can each be washed under a different, unique or separate profile. Profile selection may be automatic, based on preset or environmental monitoring inputs. Selection may also be changed by a remote or local operator, or by a local sensor as discussed below. Profiles may be edited or added locally or remotely via the Internet or other network.

D. Mobile Device

The mobile device 1 may be comprised of any type of computer for practicing the various aspects of the vehicle wash control system. For example, the mobile device can be a personal computer (e.g. APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device may comprise any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data.

A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the vehicle wash control system. For example, pointing devices such as a computer mouse, a track ball, a stylus, or a tablet to manipulate a pointer on a screen of the computer system.

The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Control Valves

The present invention preferably utilizes control valves to operating in a pulsing manner (i.e. with variable duty cycles) to deliver one or more products at a controlled or intermittent flow rate. It is preferable that the control valves be comprised of electronic control valves (e.g. solenoid valves) capable of operating at various pulse rates, however, other types of valves may be utilized. For example, the control valves may be comprised of a solenoid valve with pulse width modulated power applied or a pilot operated solenoid valve (hydraulic or pneumatic). Furthermore, the control valves may be comprised of a servo or stepper motor positioning needle/gate/globe valve or a volumetric closing system (e.g. linear motor/piston displacement). As can be appreciated, any type of device capable of controlling a flow rate of a liquid chemical using a duty cycle may be used with the various embodiments of the present invention.

Figure 3:
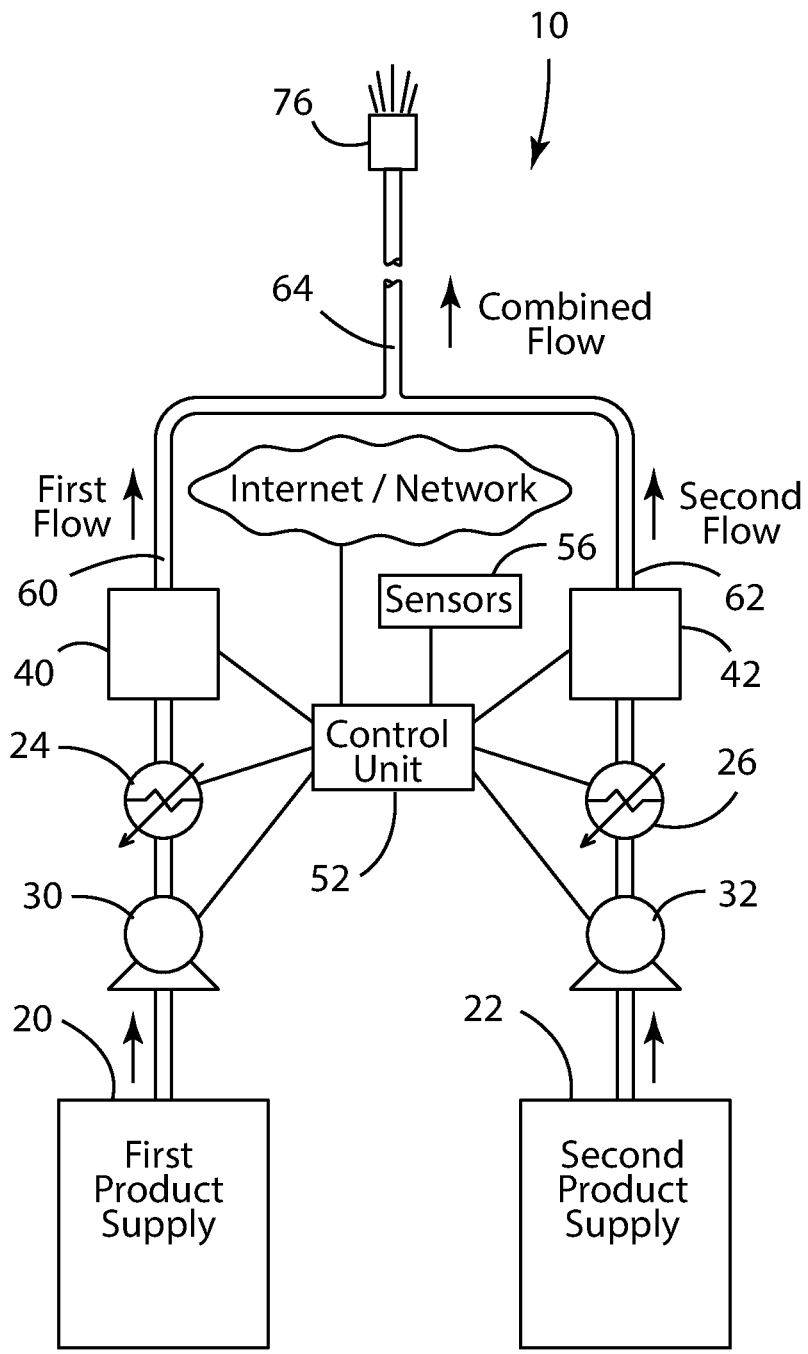
FIG. 3 is a block diagram illustrating an exemplary vehicle wash control system.

FIG. 3 illustrates a first control valve 40 fluidly connected to the first product supply 20. A first pump 30 (or any pressurizing device for liquid flow) may be fluidly positioned between the first product supply 20 and the first control valve 40 to provide the first product supply 20 in a pressurized manner. The first control valve 40 may be any valve capable of operating at a first open/close ratio (duty cycle) that dispenses the first product supply 20 at a desired first flow rate. The first open/close ratio preferably produces a consistent flow rate of the first product supply 20 to ensure that the end product dispensed by the product dispenser 76 onto the vehicle has the proper ratio of product.

FIG. 3 also shows a second control valve 42 fluidly connected to the second product supply 22. A second pump 32 may be fluidly positioned between the second product supply 22 and the second control valve 42 to provide the second product supply 22 in a pressurized manner. The second control valve 42 may be or include any valve capable of operating at a second open/close ratio that dispenses the second product supply 22 at a desired second flow rate that has a desired ratio with respect to the first flow rate. The second open/close ratio preferably produces a consistent flow rate of the second product supply 22 to ensure that the end product dispensed by the product dispenser 76 onto the vehicle has the proper ratio of products, or amount of product. As can be appreciated, more than two product supplies metered by a corresponding number of control valves may be utilized within the present invention and the illustration in the figures of two control valves is merely for illustration purposes of a preferred embodiment of the present invention. In addition, a single first control valve 40 may be utilized to control a single first product supply 20 within the vehicle wash. Furthermore, three or more control valves may be utilized to control three or more product supplies within the vehicle wash.

The control unit may also control the pressure of the output of pumps 30, 32 working in conjunction with the electronic valves. If needed, the pumps may each include an electronic pressure control valve, responsive to control the pressure of each pump's output under manual control or in response to an input from the control unit 52. In addition, there may be one or more heaters 24, 26 in line with each product supply. In this embodiment, depending on the desired wash profile, the flow, pressure, and temperature of wash product may be varied and controlled by the control unit to meet varying wash requirements.

Figure 4A:
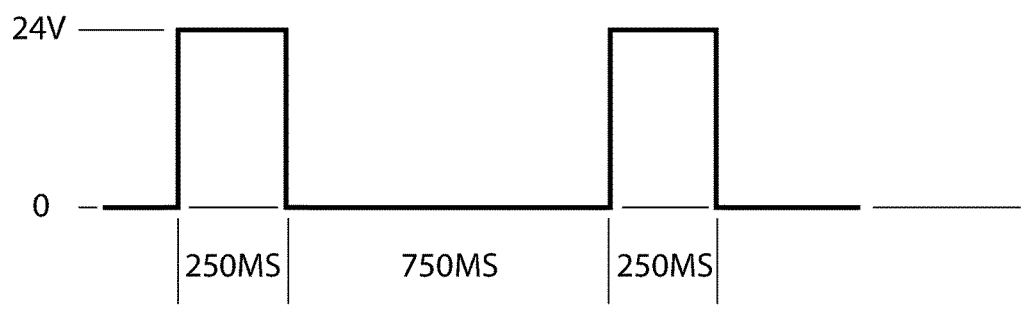
FIG. 4a is a chart illustrating a first open/close ratio (duty cycle) for an control valve.
Figure 4B:
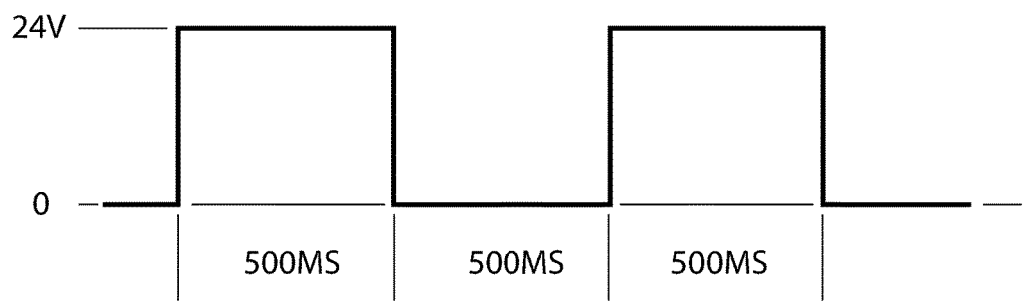
FIG. 4b is a chart illustrating a second open/close ratio (duty cycle) for an control valve.

FIGS. 4a and 4b of the drawings illustrate an exemplary duty cycle that may be used with the control valves. The first open/close ratio (4a), used for controlling the flow of the first product, and the second open/close ratio (4b), for the second product, may be different or the same depending upon the desired end product ratio. The open/close ratios may be comprised of any ratio that produces the desired flow rate of product to the vehicle wash and that the control valve is capable of operation.

F. Control Unit

FIG. 3 illustrates a control unit 52 in communication with the first control valve 40 and the second control valve 42. The control unit 52 may be programmable to allow the user to adjust the open/close ratios of the control valves 40, 42. The control unit may also be used to control other wash variables, such as wash speed/duration, fluid pressure and temperature, and wash product ratios (for example, when multiple wash chemical supplies are used). The control unit may be comprised of any electronic device capable of performing calculations, storing data, receiving data and/or transmitting data. Alternatively, the control unit may be a simpler analog or digital device that is capable of receiving an input (such as a sensor input) and adjusting one or more outputs to vary or control the duty cycles at which one or more control valves are operated.

One or more sensors 56 are preferably in communication with one or more control units, such as control unit 52. The one or more sensors 56 detect at least one condition of the vehicle wash such as but not limited to the end product flow rate being dispensed from the product dispenser 76, past weather conditions, current weather conditions, exterior temperature, room temperature, temperature of the vehicle wash products, viscosity of the vehicle wash liquid product, concentration of the vehicle wash liquid product, humidity, salt, insects, pollen, dirt or chemical concentrations (e.g. deicing and other chemicals) representative of these substances present on vehicles, vehicle cleanliness, level of dirt on a vehicle, the exterior shine of a vehicle, chain speed of the vehicle wash, and the like. Other conditions include season, time of day, weather conditions (e.g. rain, snow, temperature, sunny/cloudy/hazy, etc.). Environmental conditions in addition to those above may include wind, air contamination/pollution, tree sap, organic materials, inorganic materials and the like. Vehicle conditions (or customer request or customer preference) may also include the amount of dirt on the vehicle, insect accumulation on the front of the vehicle, location of dirt accumulation, color/type of soil accumulation on vehicle (note that soil types based on geography may be accounted for), color, type, size, and temperature of vehicle. Customer preferences for a vehicle wash may be stored and read in various manners such as a bar code on a smart phone or RFID tag.

The control unit may control the temperature, pressure, and flow rate of wash products delivered to the product dispenser, and may also control numerous other variables as needed to ensure a thorough wash, such as vehicle speed, conveyor speed, number of passes, nozzle sets, and area of vehicle to receive wash product (e.g. more wash product delivered to the front or sides, etc.).

G. Fluid Delivery System

FIG. 3 also illustrates an exemplary fluid delivery system utilizing a first product supply 20 and a second product supply 22. As shown, a first line 60 is fluidly connected to the first control valve 40 and a second line 62 is fluidly connected to the second control valve 42 to transfer the metered first product supply 20 and second product supply 22 respectively. The first line 60 and the second line 62 are both fluidly connected to a combined line 64 that combines the product supplies 20, 22 and transfers wash products to the product dispenser 76 as shown. The product dispenser 76 may be comprised of any dispensing device capable of dispensing the products onto a vehicle within the vehicle wash (e.g. spray nozzle). If additional product supplies are utilized, additional lines would be added and joined into the combined line 64. As an alternative, multiple wash chemicals may be provided individually via multiple product dispensers or multiple sets of nozzles on a product dispenser. In addition, water under pressure may be introduced into the product dispenser to mix with the chemical or detergent wash products. It can be appreciated that two or more chemicals may be combined together in series or parallel.

H. Closed Loop Control Embodiment

A closed loop configuration may be used to increase the accuracy of the wash product being applied to a vehicle. As discussed previously, the flow rate for the first product supply 20 is preferably adjusted based upon various conditions such as weather, chemical conditions (e.g. temperature, viscosity), current and past weather, surface temperature of the vehicle, and various other factors. In addition, the flow rate of the first product supply 20 may be adjusted by changing the duty cycle of the first control valve based upon real-time feedback from a sensor that detects the actual flow rate of the first product supply 20 being dispensed and the desired flow rate of first product supply 20 to be dispensed. This may be accomplished by a real-time flow rate sensor or measuring the weight or volume of the amount of first product supply 20 dispensed over time. Various types of flow rate sensors may be used to detect the real-time flow rate of the first product supply such as, but not limited to, a metering orifice, a variable area meter, a rotameter, a velocity meter, a turbine meter ultrasonic meter, a vortex meter, a positive displacement, or other mass or volumetric measurement device.

I. Operation of an Exemplary Embodiment

Figure 5:
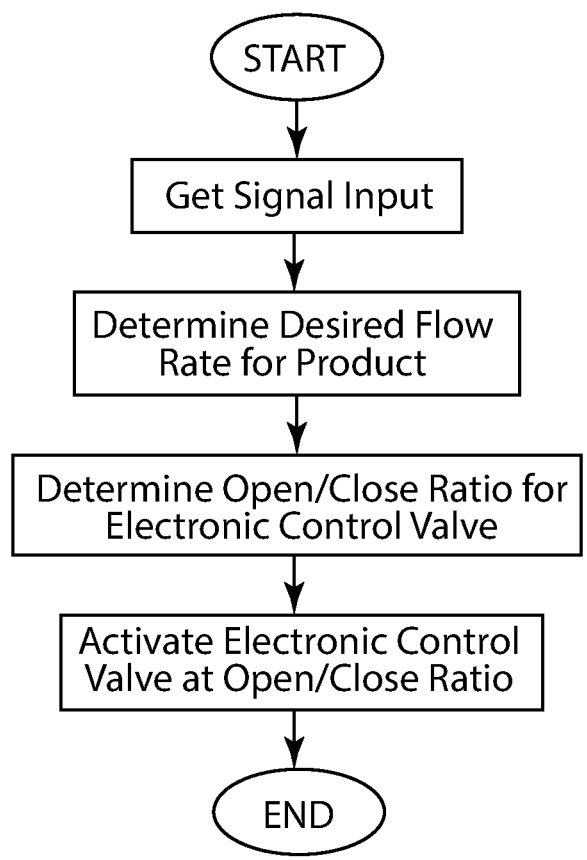
FIG. 5 is a flowchart illustrating the overall operation of an embodiment of the present system.

FIG. 5 is a flowchart illustrating the overall operation of the present system. In particular, a signal input, either remote via communication network, or from a local sensor, is received at the control unit. The desired first flow rate for the first product supply 20 is determined either by a preprogrammed flow rate or a flow rate calculated by the control unit 52 using the signal input. The control unit 52 determines the duty cycle needed to produce the desired first flow rate. The duty cycle is calculated utilizing the pressure and flow rate of the first pump 30, the size of the first control valve 40 and other factors relevant to calculating the first flow rate. The control unit 52 then transmits a first signal to the first control valve 40 thereby activating the first control valve 40 according to the determined open/close ratio. The first signal from the control unit 52 may be a pulse width modulated signal resulting in the variation of the average value of the waveform. The average value of the voltage and current transmitted to the first control valve 40 is controlled by applying electrical power at a desired duty cycle wherein the longer the electrical power is on the higher the total power is supplied to the first control valve 40.

FIGS. 4a and 4b illustrate an exemplary open/close ratio for the first control valve 40 wherein FIG. 4a illustrates a significantly lower flow rate than the flow rate of FIG. 4b. In FIG. 4a, the first control valve 40 is only open 250 MS and is closed 750 MS. In FIG. 4b, the first control valve 40 is open 500 MS and is only closed 500 MS. Various other open/close ratios may be utilized. In addition, the open/close ratio used for the first control valve may be static or dynamic dependent upon real-time factors such as, but not limited to, a change in pump pressure, a change in the amount of water being supplied, changes in one or more chemical product conditions (e.g. viscosity and/or temperature of liquid chemical product), change in room temperature and the like.

The present system is not limited to dispensing only one first product supply 20 (with or without water). The present system may be utilized to meter and dispense two or more products as discussed previously, utilizing a corresponding number of control valves. For example, the present system may utilize three colored product supplies comprised of three primary colored products to provide an infinite amount of colored products to the vehicle wash (e.g. colored wax). In addition, the present invention may utilize two or more scented product supplies to provide various scented outputs to the vehicle wash.

In addition to accurately applying a first product supply 20 to a vehicle in general, the first product supply 20 may also be adjusted to apply differing amounts of chemical product to the vehicle in different locations of the vehicle. For example, if the lower portion of the vehicle is dirtier than the upper portion, an increased amount of prewash chemical may be applied to dispensing nozzles directed to the lower portion of the vehicle compared to dispensing nozzles directed to the upper portion of the vehicle. This reduces the total amount of chemical needed to properly clean the vehicle. Various other locations of the vehicle may be treated with different volumes of chemicals such as the front of the vehicle if a significant amount of bug debris is detected by a sensor.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment of the vehicle wash control system is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present system may be embodied in other specific forms without departing from the spirit or essential attributes thereof, and it is therefore desired that the present embodiment be considered in all respects as illustrative and not restrictive. Many modifications and other embodiments of the vehicle wash control system will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the vehicle wash control system, suitable methods and materials are described above. Thus, the vehicle wash control system is not intended to be limited to the embodiments shown, but is to be accorded the widest scope consistent with the principles and features disclosed herein.

What is claimed is:

1. A vehicle wash system, comprising:
   a first product supply of a first wash component;
   a first control valve fluidly connected to the first product supply;
   a product dispenser fluidly connected to the first control valve, wherein the product dispenser is positioned within a vehicle wash and wherein the product dispenser is configured to dispense the first wash component upon a vehicle in the vehicle wash;
   a flow rate sensor that measures a real-time flow rate of the first wash component; and
   a control unit coupled to the first control valve and having an input for receiving a signal corresponding to at least one variable affecting vehicle wash effectiveness, wherein the control unit is in communication with the flow rate sensor, wherein the control unit is configured to calculate a desired flow rate of the first wash component delivered to the product dispenser and a duty cycle of the first control valve based at least partially on the at least one variable, wherein the control unit is further configured to control the flow rate of the first wash component by varying the duty cycle of the first control valve based on the desired flow rate and the real-time flow rate of the first wash component measured by the flow rate sensor.

2. The vehicle wash system of claim 1, wherein the control unit is adapted to change the flow rate substantially in real time based on the desired flow rate and the real-time flow rate of the first wash component measured by the flow rate sensor.

3. The vehicle wash system of claim 1, wherein the first control valve comprises an electronic control valve.

4. The vehicle wash system of claim 3, wherein the first control valve is comprised of a solenoid valve.

5. The vehicle wash system of claim 1, wherein the at least one variable comprises a sensed environmental condition.

6. The vehicle wash system of claim 1, wherein the at least one variable comprises a sensed chemical level.

7. The vehicle wash system of claim 1, wherein the at least one variable comprises a sensed vehicle condition.

8. The vehicle wash system of claim 1, wherein the at least one variable comprises a velocity of the vehicle in the vehicle wash.

9. The vehicle wash system of claim 1, wherein the at least one variable comprises a speed of a vehicle conveyor in the vehicle wash.

10. The vehicle wash system of claim 5, wherein the sensed environmental condition comprises temperature, humidity, precipitation, geographic location, soil composition, time of day, or time of year.

11. The vehicle wash system of claim 1, further comprising:
   a second product supply of a second wash component; and
   a second control valve fluidly connected between the second product supply and the product dispenser;
   wherein the control unit controls a second flow rate of the second wash component delivered to the product dispenser by varying a duty cycle of the second control valve based at least partially on the at least one variable.

12. The vehicle wash system of claim 11, wherein the first control valve and the second control valve comprise solenoid valves, and wherein the at least one variable represents an environmental condition comprising temperature, humidity, precipitation, geographic location, soil composition, time of day, or time of year.

13. The vehicle wash system of claim 1, wherein the control unit further includes an output for controlling a fluid temperature based at least partially on the at least one variable.

* * * * *